US010028119B2

(12) United States Patent
Dobyns

(10) Patent No.: US 10,028,119 B2
(45) Date of Patent: *Jul. 17, 2018

(54) ENCLOSURE FOR PAIRING A PLURALITY OF WIRELESS DEVICES

(71) Applicant: FREELINC TECHNOLOGIES INC., Orem, UT (US)

(72) Inventor: Douglas Howard Dobyns, Lindon, UT (US)

(73) Assignee: FREELINC TECHNOLOGIES INC., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,228

(22) Filed: Mar. 27, 2017

(65) Prior Publication Data

US 2017/0303073 A1  Oct. 19, 2017

Related U.S. Application Data

(63) Continuation of application No. 14/801,687, filed on Jul. 16, 2015, now Pat. No. 9,609,467, which is a
(Continued)

(51) Int. Cl.
| | |
|---|---|
| *H04W 4/00* | (2018.01) |
| *H04W 12/04* | (2009.01) |
| *H04W 12/02* | (2009.01) |
| *H04W 24/08* | (2009.01) |
| *H04W 4/80* | (2018.01) |

(Continued)

(52) U.S. Cl.
CPC ............ *H04W 4/80* (2018.02); *H04B 5/0075* (2013.01); *H04W 4/008* (2013.01); *H04W 12/04* (2013.01); *H04W 24/08* (2013.01); *H04W 76/023* (2013.01); *H04W 76/14* (2018.02)

(58) Field of Classification Search
CPC .............. H05K 9/0069; G01R 29/0835; G01R 29/0821; G01R 29/105; G06F 21/602; G06F 21/606; H04W 76/00; H04W 76/02; H04W 76/023; H04W 12/02; H04W 12/04; H04W 24/06; H04L 9/08; H04M 1/7253; H04B 17/0085; B25J 11/00
See application file for complete search history.

(56) References Cited

U.S. PATENT DOCUMENTS 5,594,200 A * 1/1997 Ramsey ............... H05K 9/0007
174/382
5,828,220 A * 10/1998 Carney ............... H05K 9/0069
174/350

(Continued)

FOREIGN PATENT DOCUMENTS

WO  WO 2009/095295  8/2009

*Primary Examiner* — Devan Sandiford
(74) *Attorney, Agent, or Firm* — Thorpe North & Western

(57) ABSTRACT

Various embodiments of an invention for pairing a plurality of wireless devices using wireless communications is disclosed. A method for pairing a plurality of devices comprises attenuating a pairing signal emitted from a wireless device within a pairing enclosure during a pairing procedure. A power level of the pairing signal that is emitted through the pairing enclosure is received at a pairing signal receiver. The pairing procedure is permitted to continue when the power level of the pairing signal is less than a predetermined power level.

30 Claims, 3 Drawing Sheets

Related U.S. Application Data continuation of application No. 14/486,835, filed on Sep. 15, 2014, now abandoned, which is a continuation of application No. 13/086,291, filed on Apr. 13, 2011, now Pat. No. 8,838,022.

(60) Provisional application No. 61/323,791, filed on Apr. 13, 2010.

(51) Int. Cl.
    *H04B 5/00* (2006.01)
    *H04W 76/02* (2009.01)
    *H04W 76/14* (2018.01)

(56) References Cited

U.S. PATENT DOCUMENTS

| | | | | |
|---|---|---|---|---|
| 5,908,043 A * | 6/1999 | Paes | ............ | E04B 1/92 135/115 |
| 6,487,403 B2 * | 11/2002 | Carroll | ............ | H04W 8/265 455/419 |
| 6,525,657 B1 * | 2/2003 | Wojcik | ............ | G01R 29/0857 324/612 |
| 6,657,214 B1 * | 12/2003 | Foegelle | ............ | G01R 29/0821 250/496.1 |
| 7,065,655 B1 * | 6/2006 | Jakobsson | ............ | G06F 21/606 324/156 |
| 7,277,547 B1 * | 10/2007 | Delker | ............ | H04L 63/0272 380/270 |
| 7,522,729 B2 * | 4/2009 | Ishidoshiro | ............ | H04L 63/0492 380/270 |
| 7,577,620 B1 * | 8/2009 | Donner | ............ | G06Q 10/02 705/5 |
| 8,249,935 B1 * | 8/2012 | DiMartino | ............ | G06Q 20/204 705/16 |
| 8,665,607 B2 * | 3/2014 | Bouza, II | ............ | H04K 3/28 361/800 |
| 9,048,884 B2 * | 6/2015 | Levan | ............ | H04B 5/0081 |
| 9,386,536 B2 * | 7/2016 | Meyer | | |
| 2003/0056114 A1 * | 3/2003 | Goland | ............ | H04L 63/04 726/5 |
| 2004/0009768 A1 * | 1/2004 | Waters | ............ | H04K 3/43 455/422.1 |
| 2004/0203962 A1 * | 10/2004 | Dutton | ............ | H04L 63/062 455/466 |
| 2005/0197093 A1 * | 9/2005 | Wiklof | ............ | H04L 1/1685 455/343.1 |
| 2005/0265552 A1 * | 12/2005 | Olson | ............ | H04L 63/0492 380/270 |
| 2006/0182877 A1 | 8/2006 | Creasy et al. | | |
| 2006/0187061 A1 * | 8/2006 | Colby | ............ | G06K 19/025 340/572.8 |
| 2007/0032195 A1 * | 2/2007 | Kurisko | ............ | H04L 63/061 455/41.2 |
| 2007/0106892 A1 * | 5/2007 | Engberg | ............ | G06Q 20/02 713/168 |
| 2007/0125972 A1 * | 6/2007 | Chang | ............ | H05K 9/0069 250/515.1 |
| 2007/0149237 A1 * | 6/2007 | Russell | ............ | H04W 52/28 455/522 |
| 2007/0249383 A1 * | 10/2007 | Wiklof | ............ | G06K 7/0004 455/522 |
| 2008/0076572 A1 * | 3/2008 | Nguyen | ............ | G07F 17/32 463/42 |
| 2008/0096494 A1 * | 4/2008 | Chan | ............ | H04M 1/7253 455/90.3 |
| 2008/0146265 A1 * | 6/2008 | Valavi | ............ | G06F 1/1626 455/550.1 |
| 2008/0184345 A1 * | 7/2008 | Kaechi | ............ | H04L 63/107 726/5 |
| 2008/0238676 A1 * | 10/2008 | Dhillon | ............ | G08B 13/2482 340/572.1 |
| 2008/0298587 A1 * | 12/2008 | Luk | ............ | H04L 9/083 380/255 |
| 2009/0129347 A1 * | 5/2009 | Woo | ............ | H04L 41/0806 370/338 |
| 2009/0251379 A1 * | 10/2009 | Nikitin | ............ | H01Q 1/2225 343/841 |
| 2010/0218249 A1 * | 8/2010 | Wilson | ............ | H04L 9/3226 726/19 |
| 2010/0289627 A1 * | 11/2010 | McAllister | ............ | G06Q 10/087 340/10.42 |
| 2011/0232956 A1 * | 9/2011 | Ramsey | ............ | H05K 9/0069 174/382 |
| 2012/0178364 A1 * | 7/2012 | Dobyns | ............ | H04M 1/7253 455/41.1 |
| 2013/0033279 A1 * | 2/2013 | Sozanski | ............ | G01R 29/0821 324/750.27 |
| 2013/0257468 A1 * | 10/2013 | Mlinarsky | ............ | G01R 1/18 324/750.27 |
| 2014/0055147 A1 * | 2/2014 | Haylock | ............ | G01R 1/04 324/602 |
| 2014/0072119 A1 * | 3/2014 | Hranilovic | ............ | H04L 9/3215 380/270 |
| 2015/0236811 A1 * | 8/2015 | Akita | ............ | H04K 3/65 455/1 |
| 2015/0369851 A1 * | 12/2015 | Even | ............ | H01Q 1/526 343/703 |

* cited by examiner

ENCLOSURE FOR PAIRING A PLURALITY OF WIRELESS DEVICES

CROSS-REFERENCE

This application is a continuation of U.S. patent application Ser. No. 14/801,687 filed Jul. 16, 2015 which is a continuation of U.S. patent application Ser. No. 14/486,835, filed Sep. 15, 2014, which is a continuation of U.S. patent application Ser. No. 13/086,291, filed Apr. 13, 2011, which claims the benefit under 35 U.S.C. § 119(e) of a U.S. Provisional application filed on Apr. 13, 2010 in the U.S. Patent and Trademark Office and assigned Ser. No. 61/323,791, all of which are hereby incorporated by reference for all purposes.

BACKGROUND

The use of electronic devices that can communicate wirelessly is quickly becoming ubiquitous in society. For example, it is a common practice in daily life to use mobile phones, portable computing devices, wireless headsets and ear pieces, wireless connections of electronic devices with automobiles, the internet, and other types of computing devices having wireless communication abilities. A wide variety of wireless standards for wireless communications have been developed including Bluetooth®, Zigbee®, Wibree®, GPRS, IEEE 802.11, 802.15 and 802.16, and so forth.

Sending information using wireless communications means, such as those listed above, can provide significant security risks. As the data is transmitted into free space, it becomes available for any party to receive. Reducing the risk of sending the data to an unwanted party can be accomplished using a number of techniques. One technique to reduce the risk of sending the data to unwanted groups or individuals is to encrypt the data. Wireless data encryption standards include the Wired Equivalent Privacy (WEP) standard and the Wi-Fi protected access (WPA) standard. Another technique used to protect transmitted data is through the use of an electronic handshake between two wireless devices. The handshake is also commonly referred to as pairing.

While data transmitted with wireless devices can be protected through the use of encryption and pairing, the devices can be at their most vulnerable when the encryption process and/or pairing is conducted. Pairing and encryption are typically accomplished by the transfer of encryption keys. As the encryption keys and other necessary information are communicated between the wireless devices, this information may be intercepted by an undesired party. Once the undesired party has access to the pairing and/or encryption information, they may continue to intercept wireless communications from users that the user believes is being communicated over a secure wireless link.

One method to enable secure communication between wireless devices is to require that encryption and pairing protocols are communicated over a secure link, such as a wired or fiber optic link between the two devices. However, this can be impractical based on the design of the wireless devices, and the amount of time it takes to physically connect the devices to the wired or fiber optic link. For persons having multiple devices, the time it takes to physically connect the devices and exchange encryption information can significantly reduce the benefits of using wireless devices.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
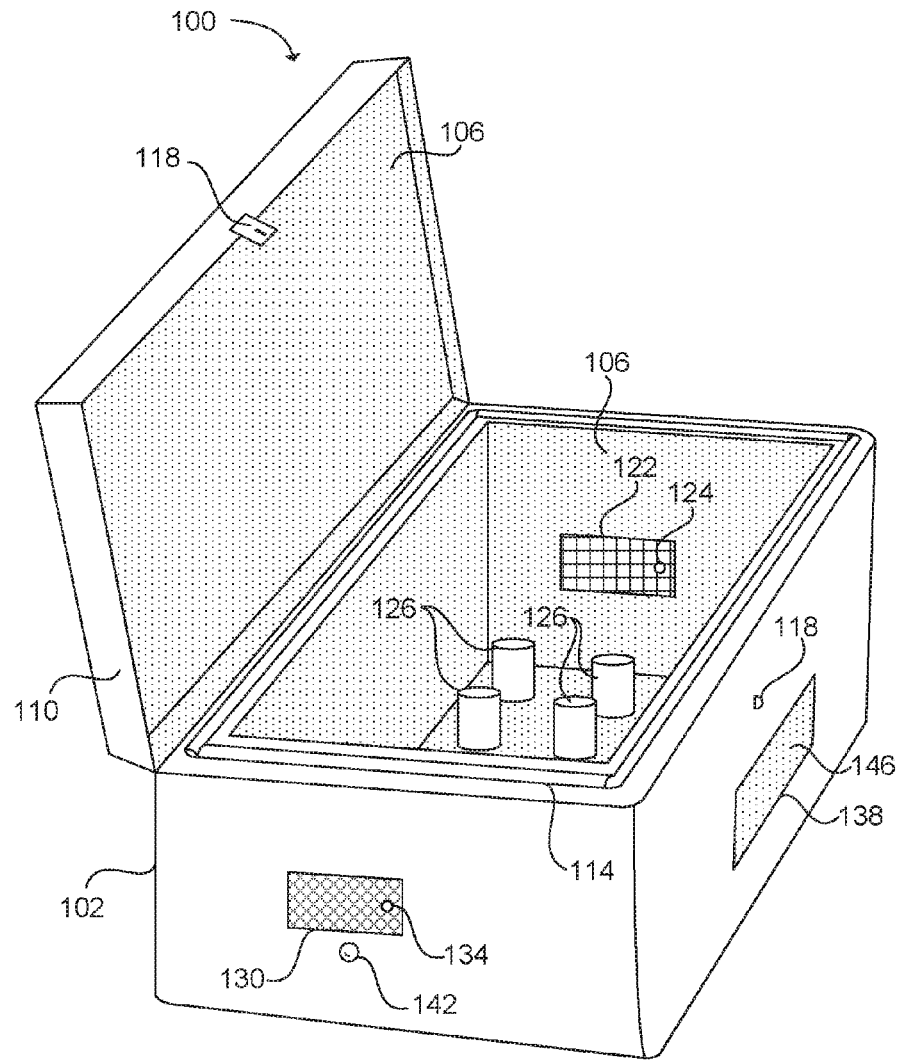
FIG. 1 illustrates an exemplary system for securely pairing a plurality of wireless devices using wireless communication in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

The ability to send secure command, control, and communication information using wireless devices has revolutionized the world. From Main Street to the military, the use of wireless devices has increased efficiency and made peoples lives more convenient and businesses more profitable.

The number of wireless links used by the armed forces has increased dramatically. For example, military personnel may have a wide number of wireless devices that are used each day in combat and support missions, including radios, microphones, head sets or ear pieces, GPS receivers, digital gun locks, and so forth. Wireless devices can be used for short distance communication in personal area networks (PANs) or for relatively long distance communication using high powered wireless radios.

Wireless devices typically communicate by modulating data on radio frequency waves and transmitting those waves. However, other types of communication are also possible, such as through the use of near field magnetic induction, wherein data is modulated on a magnetic field and communicated to nearby devices within the magnetic field.

Secure communication using these devices, whether on Wall Street or on a battle field, can provide significant advantages. Encryption is typically used to considerably reduce the risk of the transmitted data being intercepted and used by anyone other than the intended party.

The implementation of encryption in wireless devices typically involves loading and sharing encryption keys into each secure wireless device. In the military, a new encryption key may be used each day. A different encryption key may even be used for different missions on the same day. Transmitting the encryption keys to the wireless devices using a wireless transmission means can be very risky, as it may enable undesired individuals or groups to obtain the encryption key. One way to limit the transmission of unwanted information during the pairing process is through direct, wired communication.

However, the time it takes for a person to physically connect his or her multiple wireless devices to a wired system to obtain an encryption key for each device can be burdensome. For example, a soldier operating in a combat field may not have the time to connect each wireless device in times of emergency. A wireless device that has not been paired to receive an updated encryption key may not be capable of communicating; thereby rendering the device useless and reducing the technological advantage the wireless device created for the military personnel.

In order to enable a person having multiple wireless devices to pair the devices or otherwise provide a form of encryption for a data transmission from the devices using wireless communication, while minimizing the risk of transmitting critical information such as an encryption key to undesired parties, a system and method for securely pairing a plurality of wireless devices using wireless communication is disclosed.

The term "pairing", as used herein, is intended to mean the sharing of information between wireless devices which is used to increase the security of communication between two or more devices. This may include the transmission of one or more public or private encryption keys between the wireless devices. Additional information to increase communication security can also be shared, such as transmission frequency, data channel, pseudorandom noise (PN) code, modulation scheme, and so forth. In addition, multiple devices can be "paired" to enable each device to communicate using a designated encryption or other type of security measure. The pairing process can usually be initiated by entering a specific key combination in wireless devices to instruct the pairing process to take place between two or more devices. Any type of process used to enable two or more wireless communication devices to securely share wirelessly transmitted data can be used with the systems and methods disclosed herein.

In one example embodiment, a person can place his or her multiple wireless devices in a pairing enclosure. The pairing enclosure can be tested, on a periodic basis, or every time it is used, to verify that the enclosure substantially attenuates wireless signals transmitted by the multiple wireless devices. Once a successful test has been performed, the multiple wireless devices can be paired within the pairing enclosure. This enables the pairing process to be completed wirelessly, without the need to connect each wireless device to a wired system. By substantially attenuating the signals, the risk of an unwanted party being able to receive the signals that are transmitted during the pairing process is largely eliminated.

One exemplary system 100 for securely pairing a plurality of wireless devices 126 using wireless communication is illustrated in FIG. 1. The system is comprised of a pairing enclosure 102 having a layer of conductive material 106 forming a Faraday cage to substantially attenuate a radio frequency signal emitted within the pairing enclosure. The pairing enclosure can be sized based on the size and number of wireless devices 126 that are placed within the enclosure. In one embodiment, the enclosure 102 may be relatively small, such as the size of a book or lunchbox. A user can place several small wireless devices in the enclosure to allow the items to be securely paired. Alternatively, the pairing enclosure can be relatively large, such as a room or tent in which one or more persons can enter to allow the wireless devices on their person to be paired. This will be discussed more fully below.

In the example embodiment illustrated in FIG. 1, the wireless devices 126 are represented by cylinders. The cylinders are intended to represent any type of wireless device that is configured to communicate with another device through secure wireless communications and needs to communicate with at least one other device to share an encryption key or other security information to enable two or more wireless communications devices to securely share wirelessly transmitted data.

In the example embodiment illustrated in FIG. 1, the layer of conductive material 106 is shown located on the outer walls of the interior area of the pairing enclosure 102. However, the conductive layer may also be located on the outer walls of the exterior of the enclosure, or within the walls of the enclosure. More than one layer of conductive material may be provided to minimize radio frequency signal leakage from the enclosure. The conductive layer can be substantially continuous throughout the surfaces of the enclosure to minimize the leakage of radio waves from the enclosure.

A lid 110, configured to fit over an open end of the pairing enclosure 102, also includes a layer of conductive material 106. When the lid is closed, the layers of conductive material located on, or within each wall of the enclosure act to form a Faraday cage. A flexible metallized seal 114 can also be included to minimize any gaps that may occur between the lid 110 and the enclosure 102 when the lid is shut. A latching mechanism 118 can be used to provide a relatively tight seal between the lid and the enclosure when the lid is shut. The latching mechanism 118 shown in FIG. 1 is for exemplary purposes only. Any type of latching mechanism operable to keep the lid 110 in contact with the body of the enclosure 102 can be used.

The layer of conductive material 106 can be formed of a solid material such as a metal foil, or a mesh material such as a metallic screen. The size of the holes in the mesh material can be selected to have a major dimension that is less than a wavelength of the radio frequency (RF) signals emitted by the wireless devices during the pairing process. The major dimension of the holes in the mesh material will typically be at least one half of the wavelength of the RF signals emitted by the wireless devices.

The layer of conductive material 106 will typically be formed using a substantially conductive metal such as silver, copper, aluminum, or gold. It is also possible to use other types of conductive materials, such as metallized plastic or paper products, conductive carbon materials, or doped semiconductors. Any type of material may be used to form a layer of conductive material that is sufficiently conductive that it provides a desired level of attenuation of the radio frequency signals emitted by the wireless devices placed within the enclosure 102.

The system 100 further comprises a test signal transmitter 122 located within the pairing enclosure 102. The test signal transmitter is a radio frequency transmitter configured to transmit a test pairing signal. The test pairing signal may be a simple, single frequency tone emitted at a power level and frequency that is substantially similar to the frequency at which pairing of the wireless devices takes place.

The test pairing signal emitted by the test transmitter 122 may also be a more complex signal, such as a signal comprising a plurality of frequencies and power levels. The test signal may also simulate the modulation scheme used by the wireless devices. Complex modulation schemes, such as those used by digital wireless devices to transmit data, can create many unintended frequency components. By simulating the modulation scheme, the pairing enclosure can be tested more thoroughly to verify that no radio frequency signals of consequence escape the enclosure with an undesired power level during the pairing process.

The system 100 further comprises a test signal receiver 130 located external to the pairing enclosure 102. For example, FIG. 1 shows the test signal receiver coupled to the pairing enclosure. The test signal receiver can also be located a selected distance from the pairing enclosure. Measurements can be made to determine an optimal placement for the test signal receiver relative to the pairing enclosure to receive the test pairing signal emitted by the test signal transmitter 122.

The test signal receiver 130 is configured to detect a power level of the test pairing signal emitted by the test signal transmitter 122 from within the pairing enclosure 102. When the power level of the test pairing signal, as measured by the test signal receiver, is less than a predetermined power level, then the plurality of wireless devices can be paired within the pairing enclosure.

For example, the plurality of wireless devices 126 may be configured to transmit a code division multiple access (CDMA) signal with quadrature amplitude modulation (QAM) at a center frequency of 2.45 GHz and a bandwidth of 500 KHz with a power level of 0 dBm (the power ratio in decibels (dB) of the measured power referenced to one milliwatt). In one embodiment, the test signal transmitter can be configured to transmit a single frequency tone at a power level of 0 dBm and at a frequency of 2.45 GHz. Alternatively, the test signal transmitter can be configured to transmit a CDMA signal having QAM at a center frequency of 2.45 GHz and a bandwidth of 500 KHz to simulate the more complex signal transmitted by the wireless devices.

In addition, the test pairing signal may be transmitted with a greater power level than the wireless devices 126 typically transmit at when pairing. For example, the test pairing signal may be transmitted at a power level of 3 dBm when the wireless devices transmit a 0 dBm signal when pairing. The higher power test signal can provide added assurance that the signals transmitted by the wireless devices when pairing will not be detected by unwanted parties.

In one embodiment, the test signal transmitter 122 can be configured to transmit a test pairing signal that is a spread spectrum signal to reduce potential interference with environmental noise. If a test with a standard test pairing signal continually fails, a user can switch the test signal transmitter to output the spread spectrum test pairing signal to reduce the effects of the environmental noise. The test signal receiver 130 can be configured to receive the spread spectrum test pairing signal and despread the signal to minimize the effects of the environmental noise.

The test signal receiver 130 is configured to receive the test signal transmitted by the test signal transmitter 122 and to analyze the signal. The test signal receiver can verify that the power level of the test pairing signal at the test signal receiver is less than a predetermined level. For example, a threshold level of −60 dB of attenuation may be desired. If the test pairing signal is measured at the test signal receiver to have a maximum power that is less than −60 dBm, then the test signal receiver can indicate that the pairing enclosure is properly sealed.

The actual threshold level is dependent on the power output of the devices being paired. For example, high power radios having an output of +30 dBm may require a reduction in power of 90 dB to −60 dBm. The pairing enclosure 102 can be configured to provide a desired amount of attenuation. Multiple layers of the conductive material may be used to further increase the power level drop between the inside and outside of the pairing enclosure for enclosures designed to work with high power wireless devices.

Once the test signal receiver 130 indicates that the pairing enclosure 102 is properly sealed, the wireless devices 126 can be paired within the pairing enclosure. An indicator 134 on the test signal receiver may be used to show when the pairing enclosure is properly sealed based on the measured power level. The indicator can also be used to show when pairing has been successfully completed. The indicator may also be located on the pairing enclosure 102. In one embodiment, the pairing enclosure may have an electrically activated lock to ensure that the lid 110 cannot be opened when pairing of wireless devices is taking place.

In another embodiment, a window 138 may be included in the pairing enclosure 102 to enable the wireless devices 126 to be viewed. Many types of wireless devices are configured to provide visual indicators related to the operation of the device. For example, a wireless device may have an indicator LED light that blinks 3 times if pairing failed for a selected reason. The indicator light may turn on for a selected time period, such as 2 seconds, if pairing is successful. By placing a window in the pairing enclosure it can be easier to debug any problems that may occur with the wireless devices in the pairing process. A user can also determine when pairing has been successfully completed.

A layer of conductive material 146, such as a wire mesh, can be adhered to the window 138 to provide the attenuation of the pairing signals. The conductive material 146 may be the same or different than the conductive material 106. For example, a solid foil may be applied to the surfaces of the pairing enclosure while a mesh screen may be applied to the window to allow a user to view the wireless devices 126 in the pairing enclosure 102 when the enclosure is sealed.

The transmitter 122 and receiver 130 can be in communication with each other to enable feedback from the test. For example, in one embodiment the test signal receiver can indicate that a test is successful only when a notification signal is first received from the test signal transmitter containing information that a test pairing signal has been sent. The connection may be wired or wireless. A wired connection between the transmitter and receiver may be most beneficial so that the layer of conductive material 106 does not interfere with the connection. When the notification signal is received, and the test pairing signal is measured at the receiver as having a power level less than the threshold, then an indicator can show that the test is successful. If there is no communication between the transmitter and receiver, it may be difficult to determine at the receiver whether a test pairing signal was sent. This is especially true when substantially low power signals are measured, or when electronic noise is present that may be picked up by the receiver. In addition, the test signal transmitter can also include an indicator 124 that may be viewed through the window 138 to verify that the transmitter is sending a test pairing signal.

In another embodiment, one of the wireless devices 126 can be used as the test signal transmitter. A user can activate one or more wireless devices to send a test signal. The test signal may be a specific signal, or an actual pairing signal sent with an incorrect code or cryptography algorithm. When the lid on the pairing enclosure 102 is closed and sealed, a measurement can be made at the test signal receiver 130 to determine if the test pairing signal is less than the threshold. If so, the user can pair all of his or her devices using a desired code or cryptography algorithm. Using one of the wireless devices 126 to send the test pairing signal can significantly reduce the complexity of the system since there is no need to replicate a signal of the wireless device. This is especially true of high power signals, or wherein the system is used to pair a plurality of different kinds of wireless devices that operate at different powers and frequencies.

In one embodiment, the test signal receiver 130 can continue to operate and measure any signals leaking from the pairing enclosure 102 during the pairing process of the wireless devices 126. If a signal is measured that is significantly greater than the threshold power level, such as a signal that is 12 dB greater than the maximum allowable power output, a radio frequency noise generator can be operated at a relatively high power to mask the signals leaking from the pairing enclosure 102. The noise generator can be configured to operate at a similar frequency and bandwidth as the wireless devices 126.

In another example embodiment, a user can place his or her wireless devices 126 that need to be paired into the pairing enclosure 102, close the lid 110 and seal the enclosure with the latching mechanism 118. The user can activate a button 142 that may be located on the test signal receiver 130 or the enclosure 102. The button can activate an automatic test sequence in which the test signal transmitter 122 transmits a test pairing signal. The test signal receiver can attempt to receive the test signal based on one or more of the selected frequency, bandwidth, power range, and modulation scheme. If no signal is received, or the signal that is received is less than the threshold power level, then pairing of the wireless devices can take place.

In one embodiment, pairing of the wireless devices 126 in the pairing enclosure 102 can be accomplished by setting each desired wireless device, prior to shutting the lid 110, to pair within a predetermined time period, such as after one minute. The pairing enclosure can then be tested, as previously described. Such testing may be accomplished in a predetermined time period, such as within 15-30 seconds depending on the power level to be detected by the test signal receiver 130. If the test signal receiver indicates a failure, then the pairing of the wireless devices can be cancelled. If the test signal receiver indicates a successful test, then pairing can be allowed to proceed.

Alternatively, the wireless devices 126 can be configured to receive a wireless signal from the test signal transmitter 122 to conduct pairing. This signal will then only be sent after a successful test is reported by the test signal receiver 130 to the test signal transmitter. The test signal transmitter will then send a signal to the wireless devices located within the sealed pairing enclosure 102. Completion of pairing can be determined based on visual indicators on the wireless devices 126 as seen through a window 138, based on an indicator 134 viewable outside the enclosure 102, or after a selected period of time has passed.

In one embodiment, the plurality of wireless devices 126 can be inserted into the enclosure while attached to an object. For example, a soldier operating in a battlefield may have a plurality of wireless devices attached to his or her vest and helmet. The soldier may place the vest and helmet into the enclosure 102 and proceed to pair the electronic devices within the enclosure, as discussed above, while they are still attached.

Figure 2:
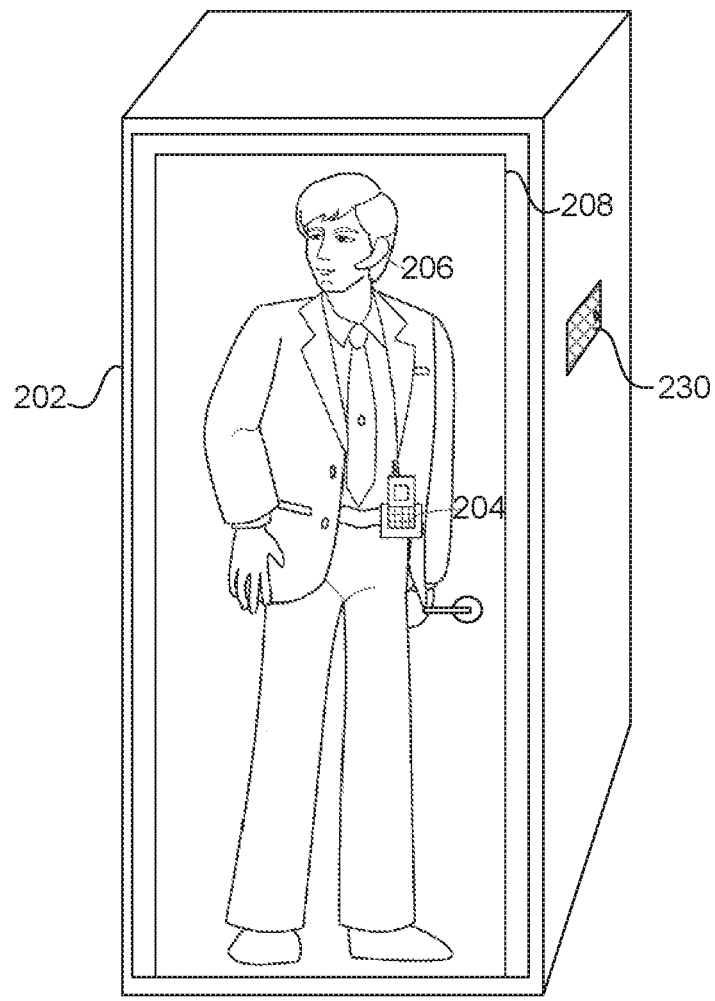
FIG. 2 illustrates a walkable pairing enclosure for securely pairing a plurality of wireless devices using wireless communication in accordance with an embodiment of the present invention.

FIG. 2 shows an example embodiment illustration of a pairing enclosure 202 having a greater size than the pairing enclosure 102 shown in FIG. 1. In this example embodiment, a person can walk into the enclosure 202 with the plurality of wireless devices attached. For instance, a person is shown wearing a wireless radio 204 and wireless headset 206. Similarly, a soldier having multiple wireless devices, such as a radio, headset, GPS receiver, wireless trigger lock, and so forth can enter the pairing enclosure 202 to pair the wireless devices.

The pairing enclosure 202 shown in the example embodiment of FIG. 2 can operate in the same fashion as the smaller pairing enclosure 102. The pairing enclosure 202 can include a layer of conductive material forming a Faraday shield to substantially attenuate a radio frequency signal emitted within the pairing enclosure. The layer of conductive material can be located on an inside of each surface, an outside of each surface, or somewhere in between. Multiple layers of conductive material can also be used to increase the amount of attenuation of a signal passing through a surface of the enclosure. A door 208 enables a person to enter the pairing enclosure. The door includes at least one layer of the conductive material. A metalized seal, similar to the seal 114 in FIG. 1, can be placed near a perimeter of the door and act as weather stripping that can minimize radio frequency leakage from any openings between the door and the enclosure 202. A test signal transmitter similar to the transmitter 122 is located within the pairing enclosure and configured to transmit a test pairing signal.

A test signal receiver 230 is located external to the pairing enclosure and configured to detect a power level of the test pairing signal emitted within the pairing enclosure. The test signal receiver is coupled to the test signal transmitter. In one embodiment, the test signal receiver can send a signal to the test signal transmitter when the test pairing signal is determined to be less than a predetermined level. The test signal transmitter can then send a signal to the wireless devices instructing the devices that the pairing process can begin.

Alternatively, the test signal receiver can send a signal when the test pairing signal is determined to be less than a predetermined level. The signal can light an indicator (not shown) within the pairing enclosure 202, indicating to the person within the enclosure that the pairing process can begin. The person can then manually perform the pairing process on his or her wireless devices once the indicator shows that the pairing enclosure is properly sealed.

While a rectangular shaped pairing enclosure 202 is shown in FIG. 2, the shape of the enclosure is not important. Any shape of enclosure that provides sufficient attenuation of a pairing signal produced by a wireless device can be used. For example, a pairing enclosure may be formed with two circular frames having a conductive mesh screen connected to the circular frames so as to surround the top, bottom, and sides of the frames.

Additional types of pairing enclosures can also be constructed to provide an enclosure in which multiple wireless devices can be paired while minimizing transmission of the pairing signal. For example, a pairing enclosure may be constructed in the form of a converted vehicle holding room, any walkable enclosure (i.e. an enclosure large enough for a person to walk into), a box, a dome, a sphere, a tent, a teepee, a poncho, an overcoat and so forth. In each case, the pairing enclosure includes a layer of conductive material forming a Faraday shield (i.e. Faraday cage) to substantially attenuate a radio frequency signal emitted within the pairing enclosure.

When the pairing enclosure is wearable, such as the poncho, the enclosure is designed to substantially enclose at least a portion of the person wearing it. For example, the poncho can have a substantially snug fit around a person's neck, and a flap at the bottom of the poncho that can be secured around a person's legs. The poncho includes at least one layer of the conductive material. Once the poncho is secured on a person, the person can first send a test pairing signal. A test signal receiver located outside the poncho can be used to determine whether the test pairing signal is received that is greater than the predetermined threshold, as previously discussed. If the test pairing signal is greater, then the top and bottom of the poncho can be checked and better secured on the person. The test can then be repeated until the test pairing signal at the test signal receiver is less than the predetermined level. The person can then proceed to pair the plurality of wireless devices on the person that are located within the poncho.

Figure 3:
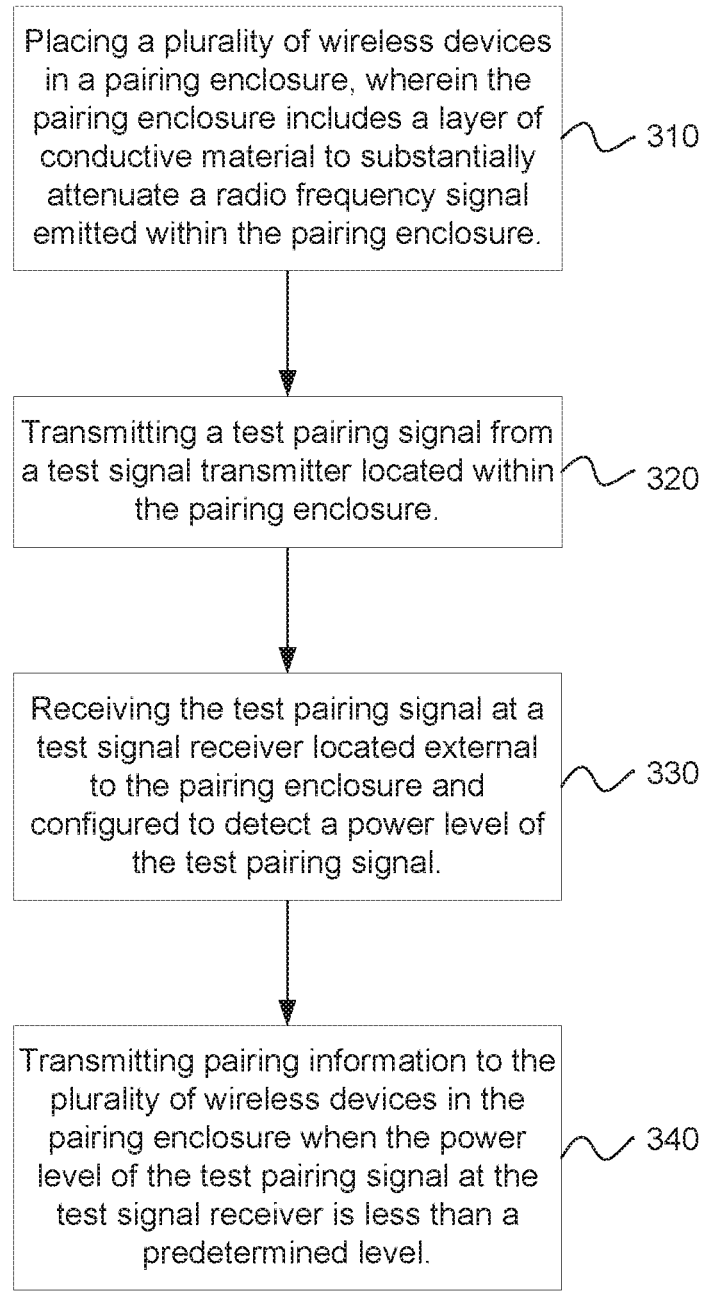
FIG. 3 depicts a method for securely pairing a plurality of wireless devices in accordance with an embodiment of the present invention.

In another embodiment, a method for pairing a plurality of wireless devices is disclosed, as depicted in the flow chart of FIG. 3. The method comprises the operation of placing 310 the plurality of wireless devices in a pairing enclosure. The pairing enclosure includes a layer of conductive material to substantially attenuate a radio frequency signal emitted within the pairing enclosure. A test pairing signal is transmitted 320 from a test signal transmitter located within the pairing enclosure. The test pairing signal is received 330 at a test signal receiver located external to the pairing enclosure. The test signal receiver is configured to detect a power level of the test pairing signal. Pairing information is then transmitted 340 to the plurality of wireless devices in the pairing enclosure when the power level of the test pairing signal at the test signal receiver is less than a predetermined level.

The use of wireless devices can substantially increase efficiencies and provides many conveniences. However, the information transmitted by wireless devices is typically desired to remain private. To enable private transmission of wireless data, encryption and pairing processes can be used. When encryption and pairing information are shared between wireless devices, they are typically at their most vulnerable. To enable wireless pairing to take place between multiple wireless devices, while minimizing the detection of the pairing scheme, a pairing enclosure can be used as described above.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium having instructions embodied thereon, the instructions when executed by a wireless device perform the following:
   transmit a pairing signal from a wireless device within a pairing enclosure during a pairing procedure, wherein the pairing signal is attenuated by the pairing enclosure, through the pairing enclosure to a pairing signal receiver, wherein the pairing signal receiver is configured to detect a power level of the pairing signal; and
   permit the pairing procedure to continue based on the power level of the pairing signal that is detected by the pairing signal receiver; or
   terminate the pairing procedure based on the power level of the pairing signal that is detected by the pairing signal receiver;
   wherein the pairing procedure includes pairing the wireless device in the pairing enclosure to a secondary device inside the pairing enclosure.

2. The at least one non-transitory machine readable storage medium of claim 1, wherein the pairing signal is attenuated using at least one shielding layer of the pairing enclosure, wherein the shielding layer is comprised of a radio frequency shielding material or a magnetic field shielding material.

3. The at least one non-transitory machine readable storage medium of claim 1, wherein the instructions further perform the following:
transmit a test pairing signal from a test signal transmitter through the pairing enclosure to enable the pairing signal receiver to determine an amount of attenuation of the test pairing signal.

4. The at least one non-transitory machine readable storage medium of claim 3, wherein the test signal transmitter is located at one of internal to the pairing enclosure or external to the pairing enclosure and the pairing signal receiver is located at one of external to the pairing enclosure or internal to the pairing enclosure.

5. The at least one non-transitory machine readable storage medium of claim 3, wherein the test pairing signal is transmitted as at least one of: a single frequency, a plurality of frequencies, or a modulated signal to determine an amount of attenuation provided by the pairing enclosure.

6. The at least one non-transitory machine readable storage medium of claim 1, wherein the pairing enclosure includes a pairing transceiver configured to transmit pairing information to the wireless device during the pairing procedure, wherein the pairing information is selected from the group consisting of a public encryption key, a private encryption key, a transmission frequency, a data channel, a pairing identification number, a pseudorandom noise (PN) code, a modulation scheme, a frequency hopping schedule, a software update, and a firmware update.

7. The at least one non-transitory machine readable storage medium of claim 1, wherein the pairing signal is a radio frequency signal or a near field magnetic induction signal.

8. The at least one non-transitory machine readable storage medium of claim 1, wherein the pairing enclosure is an enclosure selected from the group consisting of a vehicle holding room, a walkable enclosure, a box, a dome, a sphere, a tent, a teepee, a poncho, and an overcoat.

9. The at least one non-transitory machine readable storage medium of claim 1, wherein the pairing enclosure is a portable environment configured to enable a person to walk into.

10. The at least one non-transitory machine readable storage medium of claim 1, wherein the pairing enclosure is an enclosure with a lid that has a sufficient size to contain a plurality of the wireless devices.

11. The at least one non-transitory machine readable storage medium of claim 1, wherein the pairing enclosure is wearable by a person.

12. The at least one non-transitory machine readable storage medium of claim 1, wherein the instructions further perform the following:
transmit a noise signal to mask the pairing signal transmitted in the pairing enclosure, wherein the noise source is transmitted when the pairing signal is measured by the pairing signal receiver to be greater than a predetermined power level.

13. An apparatus of a pairing signal receiver, the apparatus configured to:
receive, at the pairing signal receiver, a pairing signal from a wireless device through a pairing enclosure during a pairing procedure, wherein the pairing signal is attenuated by the pairing enclosure;
detect a power level of the pairing signal; and
permit the pairing procedure to continue based on the power level of the pairing signal that is detected by the pairing signal receiver; or
terminate the pairing procedure based on the power level of the pairing signal that is detected by the pairing signal receiver,
wherein the pairing procedure includes pairing the wireless device in the pairing enclosure to a secondary device inside the pairing enclosure.

14. The apparatus of claim 13, wherein the pairing signal is attenuated using at least one shielding layer of the pairing enclosure, wherein the shielding layer is comprised of a radio frequency shielding material or a magnetic field shielding material.

15. The apparatus of claim 13, wherein the pairing signal receiver is further configured to:
receive a test pairing signal from a test signal transmitter through the pairing enclosure to enable the pairing signal receiver to determine an amount of attenuation of the test pairing signal.

16. The apparatus of claim 15, wherein the test signal transmitter is located at one of internal to the pairing enclosure or external to the pairing enclosure and the pairing signal receiver is located at one of external to the pairing enclosure or internal to the pairing enclosure.

17. The apparatus of claim 15, wherein the test pairing signal is transmitted as at least one of: a single frequency, a plurality of frequencies, or a modulated signal to determine an amount of attenuation provided by the pairing enclosure.

18. The apparatus of claim 13, wherein the pairing enclosure includes a pairing transceiver configured to transmit pairing information to the wireless device during the pairing procedure, wherein the pairing information is selected from the group consisting of a public encryption key, a private encryption key, a transmission frequency, a data channel, a pairing identification number, a pseudorandom noise (PN) code, a modulation scheme, a frequency hopping schedule, a software update, and a firmware update.

19. The apparatus of claim 13, wherein the pairing signal is a radio frequency signal or a near field magnetic induction signal.

20. The apparatus of claim 13, wherein the pairing enclosure is an enclosure selected from the group consisting of a vehicle holding room, a walkable enclosure, a box, a dome, a sphere, a tent, a teepee, a poncho, and an overcoat.

21. The apparatus of claim 13, wherein the pairing enclosure is a portable environment configured to enable a person to walk into.

22. The apparatus of claim 13, wherein the pairing enclosure is an enclosure with a lid that has a sufficient size to contain a plurality of the wireless devices.

23. The apparatus of claim 13, wherein the pairing enclosure is wearable by a person.

24. The apparatus of claim 13, wherein the pairing signal receiver is further configured to:
receive a noise signal that masks the pairing signal transmitted in the pairing enclosure, wherein the noise source is transmitted when the pairing signal is measured by the pairing signal receiver to be greater than a predetermined power level.

25. At least one non-transitory machine readable storage medium having instructions embodied thereon, the instructions when executed by a wireless device perform the following:
receive, at a pairing signal receiver, a pairing signal from a wireless device through a pairing enclosure during a pairing procedure, wherein the pairing signal is attenuated by the pairing enclosure;
detect a power level of the pairing signal; and permit the pairing procedure to continue based on the power level of the pairing signal that is detected by the pairing signal receiver; or terminate the pairing procedure based on the power level of the pairing signal that is detected by the pairing signal receiver, wherein the pairing procedure includes pairing the wireless device in the pairing enclosure to a secondary device inside the pairing enclosure.

26. The at least one non-transitory machine readable storage medium of claim 25, wherein the pairing signal is attenuated using at least one shielding layer of the pairing enclosure, wherein the shielding layer is comprised of a radio frequency shielding material or a magnetic field shielding material.

27. The at least one non-transitory machine readable storage medium of claim 25, the instructions further perform the following:

receive a test pairing signal from a test signal transmitter through the pairing enclosure to enable the pairing signal receiver to determine an amount of attenuation of the test pairing signal.

28. The at least one non-transitory machine readable storage medium of claim 27, wherein the test signal transmitter is located at one of internal to the pairing enclosure or external to the pairing enclosure and the pairing signal receiver is located at one of external to the pairing enclosure or internal to the pairing enclosure.

29. The at least one non-transitory machine readable storage medium of claim 27, wherein the test pairing signal is transmitted as at least one of: a single frequency, a plurality of frequencies, or a modulated signal to determine an amount of attenuation provided by the pairing enclosure.

30. The at least one non-transitory machine readable storage medium of claim 25, wherein the pairing enclosure includes a pairing transceiver configured to transmit pairing information to the wireless device during the pairing procedure, wherein the pairing information is selected from the group consisting of a public encryption key, a private encryption key, a transmission frequency, a data channel, a pairing identification number, a pseudorandom noise (PN) code, a modulation scheme, a frequency hopping schedule, a software update, and a firmware update.

\* \* \* \* \*